US012575489B2

(12) United States Patent
Sparrow et al.

(10) Patent No.: US 12,575,489 B2
(45) Date of Patent: Mar. 17, 2026

(54) WEED TRIMMER MOUNT ASSEMBLY

(71) Applicants: Keith Sparrow, Jeanerette, LA (US);
Lorita M. Raymond-Sparrow,
Jeanerette, LA (US)

(72) Inventors: Keith Sparrow, Jeanerette, LA (US);
Lorita M. Raymond-Sparrow,
Jeanerette, LA (US)

( * ) Notice: Subject to any disclaimer, the term of this
patent is extended or adjusted under 35
U.S.C. 154(b) by 605 days.

(21) Appl. No.: 18/076,010

(22) Filed: Dec. 6, 2022

(65) Prior Publication Data

US 2024/0180076 A1      Jun. 6, 2024

(51) Int. Cl.
A01D 34/64       (2006.01)
A01D 34/416      (2006.01)
A01D 34/84       (2006.01)

(52) U.S. Cl.
CPC ......... A01D 34/64 (2013.01); A01D 34/4165
(2013.01); A01D 34/84 (2013.01); *A01D*
*2034/645* (2013.01)

(58) Field of Classification Search
CPC ...... A01D 34/64; A01D 34/661; A01D 34/84;
A01D 34/86; A01D 67/005; A01D 59/00
See application file for complete search history.

(56) References Cited

U.S. PATENT DOCUMENTS

| | | | |
|---|---|---|---|
| D334,200 S | 3/1993 | Clifton | |
| 5,303,532 A | * 4/1994 | Phillips | ................ A01D 34/866 |
| | | | 56/14.9 |

| | | | |
|---|---|---|---|
| 5,694,752 A | * 12/1997 | Warfield, III | ........ A01B 59/046 |
| | | | 56/13.6 |
| 6,381,936 B1 | 5/2002 | Lin | |
| 6,397,572 B1 | 6/2002 | Roundy | |
| 6,892,518 B1 | 5/2005 | Bares | |
| 6,966,168 B1 | * 11/2005 | Kerr, Sr. | ................ A01D 43/16 |
| | | | 56/12.7 |
| 6,986,238 B1 | * 1/2006 | Bloodworth | ........... A01D 34/84 |
| | | | 56/17.6 |
| 7,398,637 B1 | * 7/2008 | Sevey | .................... A01D 34/84 |
| | | | 56/14.9 |
| 7,712,293 B1 | * 5/2010 | Recker | ................. A01D 75/008 |
| | | | 56/13.7 |
| 8,322,121 B1 | 12/2012 | Marcell | |
| 10,966,370 B1 | * 4/2021 | Clark | ..................... A01D 43/16 |
| 2004/0154277 A1 | 8/2004 | Shumate | |

(Continued)

FOREIGN PATENT DOCUMENTS

WO      WO2021146770      7/2021

*Primary Examiner* — Kristen C Hayes

(57) ABSTRACT

A weed trimmer mount assembly includes a mount that is
attachable to a mounting location of a riding lawn mower.
An arm is pivotally attached to the mount thereby facilitat-
ing the arm to be accessible to a rider of the riding lawn
mower. The arm is positionable between a deployed position
and a stored position. A weed trimmer is coupled to the arm
and the weed trimmer is positioned adjacent to the ground
when the lever is positioned in the deployed position thereby
facilitating the weed trimmer to be oriented for trimming
weeds on the ground. The weed trimmer is lifted from the
ground when the lever is positioned in the stored position
thereby facilitating the riding lawn mower to be operated in
a normal manner. A speed control is mounted to the riding
lawn mower for adjusting an operational speed of the weed
trimmer.

9 Claims, 8 Drawing Sheets

(56) References Cited

U.S. PATENT DOCUMENTS

2008/0216459  A1 *   9/2008  Spitzley ................. A01D 34/84
                                                56/12.7
2010/0000192  A1 *   1/2010  Robison ................. A01D 34/84
                                                56/10.2 R
2019/0053428  A1 *   2/2019  Parker ................... F16M 11/10

* cited by examiner

WEED TRIMMER MOUNT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to weed trimmer devices and more particularly pertains to a new weed trimmer device for mounting a weed trimmer to a riding lawn mower. The device includes an arm that is pivotally attached to a riding lawn mower and a weed trimmer that is attached to the arm. The arm is positionable between a deployed position and a stored position for either deploying or storing the weed trimmer. The device includes a speed control that is mounted to the riding lawn mower and the speed control is in communication with the weed trimmer for turning the weed trimmer on and off.

(2) Description of Related Art Including Information Disclosed Under 37 CFR 1.97 and 1.98

The prior art relates to weed trimmer devices including a weed trimmer mounting device to rotatably mounting a weed trimmer to the front of a push mower. The prior art discloses a weed trimmer mounting device that includes a first arm pivotally mounted to a lawn mower, a second arm pivotally mounted to the lawn mower and a weed trimmer mounted to the second arm. The first arm has a first gear which enmeshes with a second gear on the second arm for moving the weed trimmer between a stored position and a deployed position. The prior art discloses a trimmer assembly that is releasably mountable to a lawn mower and which includes a swing arm, a belt and a set of pulleys. The prior art discloses a variety of weed trimmer mounts that each at least includes a vertical member that is attached to a mounting location of a riding lawn mower and a weed trimmer that is pivotally attached to the vertical member for pivoting the weed trimmer between a lowered position and a lifted position. The prior art discloses a weed trimmer mount that includes a series of arms that are mounted to a front of a lawn mower and a weed trimmer disposed on the arms that can be deployed laterally.

BRIEF SUMMARY OF THE INVENTION

An embodiment of the disclosure meets the needs presented above by generally comprising a mount that is attachable to a mounting location of a riding lawn mower. An arm is pivotally attached to the mount thereby facilitating the arm to be accessible to a rider of the riding lawn mower. The arm is positionable between a deployed position and a stored position. A weed trimmer is coupled to the arm and the weed trimmer is positioned adjacent to the ground when the lever is positioned in the deployed position thereby facilitating the weed trimmer to be oriented for trimming weeds on the ground. The weed trimmer is lifted from the ground when the lever is positioned in the stored position thereby facilitating the riding lawn mower to be operated in a normal manner. A speed control is mounted to the riding lawn mower for adjusting an operational speed of the weed trimmer.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
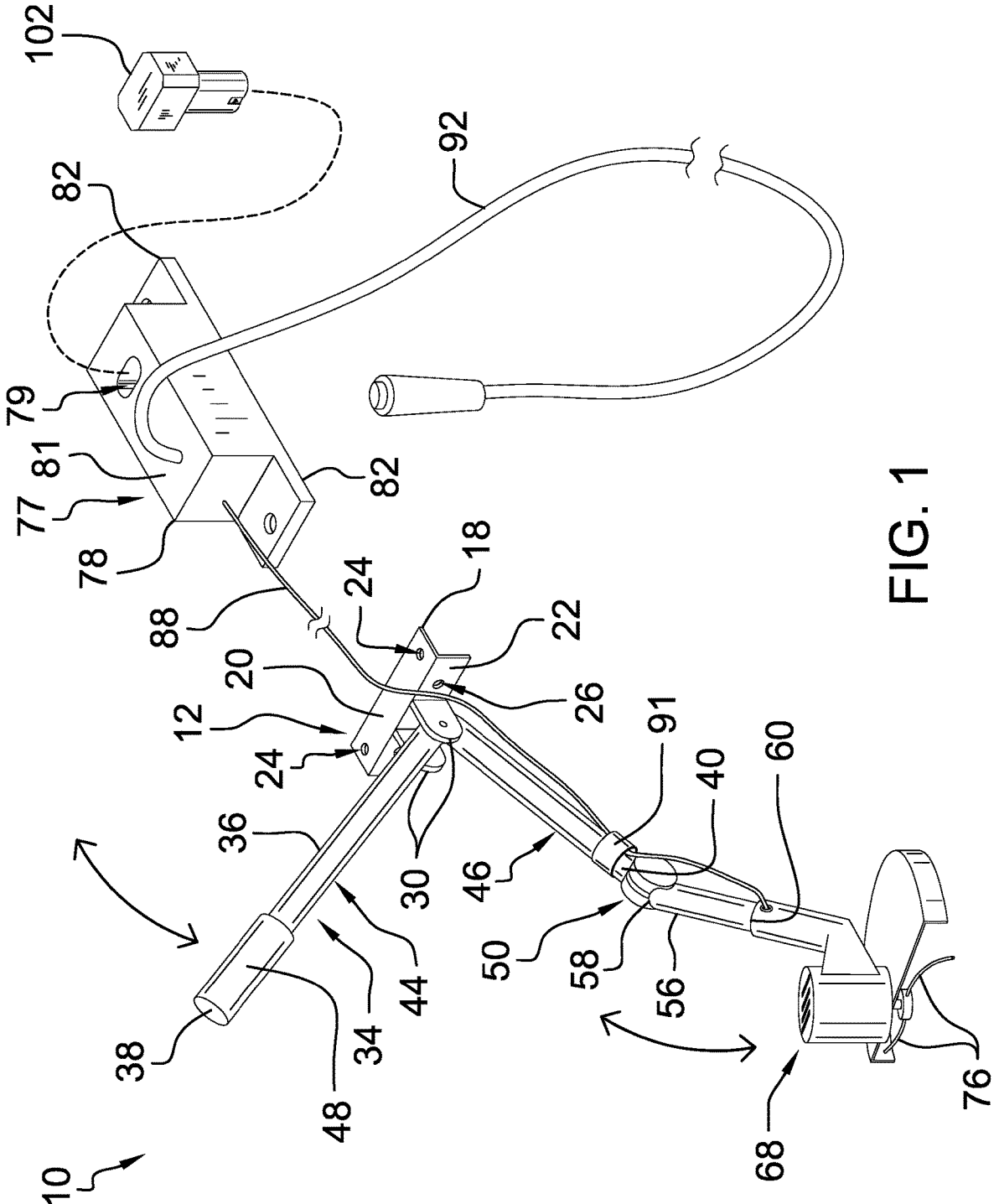
FIG. 1 is a top perspective view of a weed trimmer mount assembly according to an embodiment of the disclosure.
Figure 2:
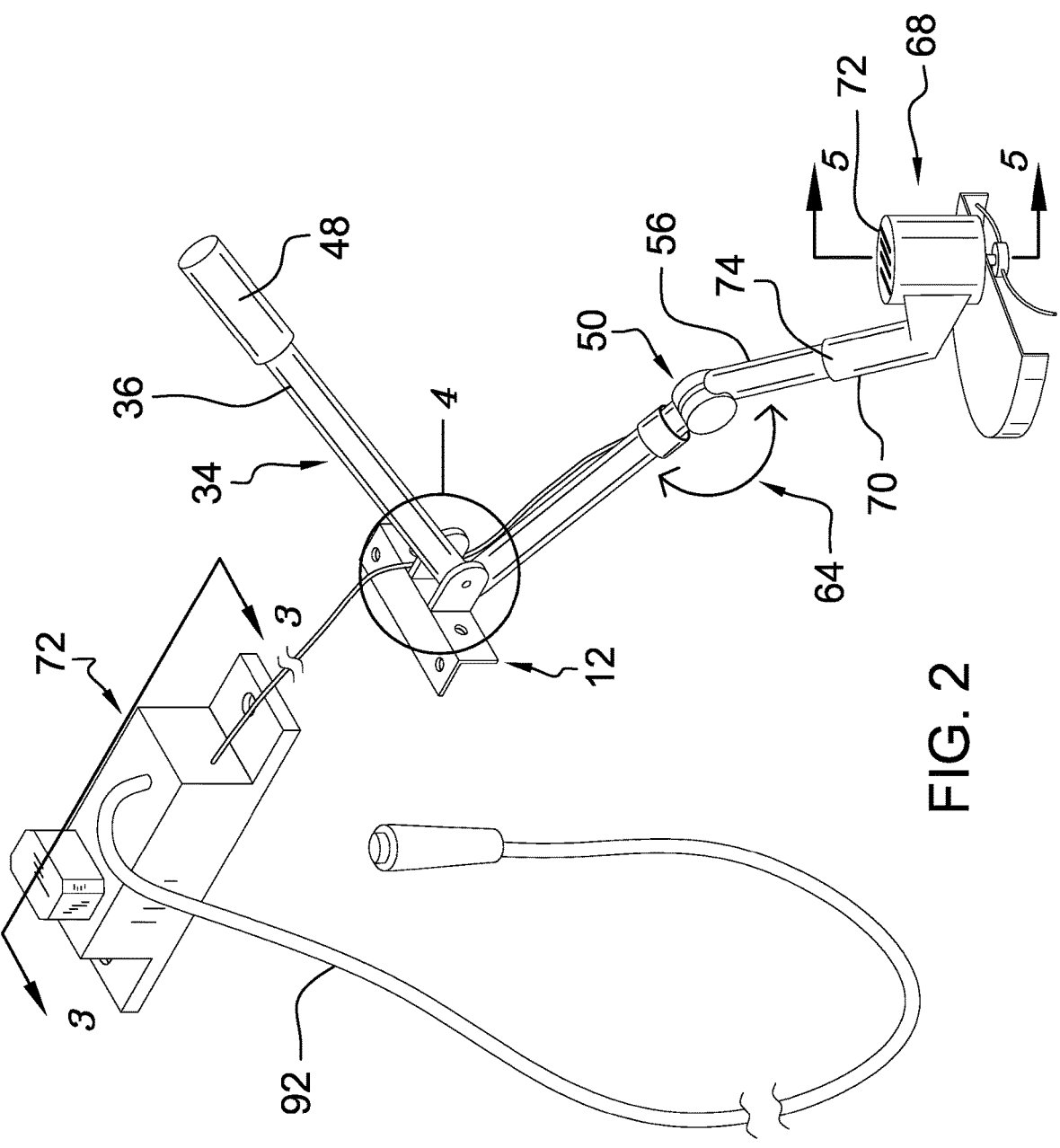
FIG. 2 is a front perspective view of an embodiment of the disclosure.
Figure 3:
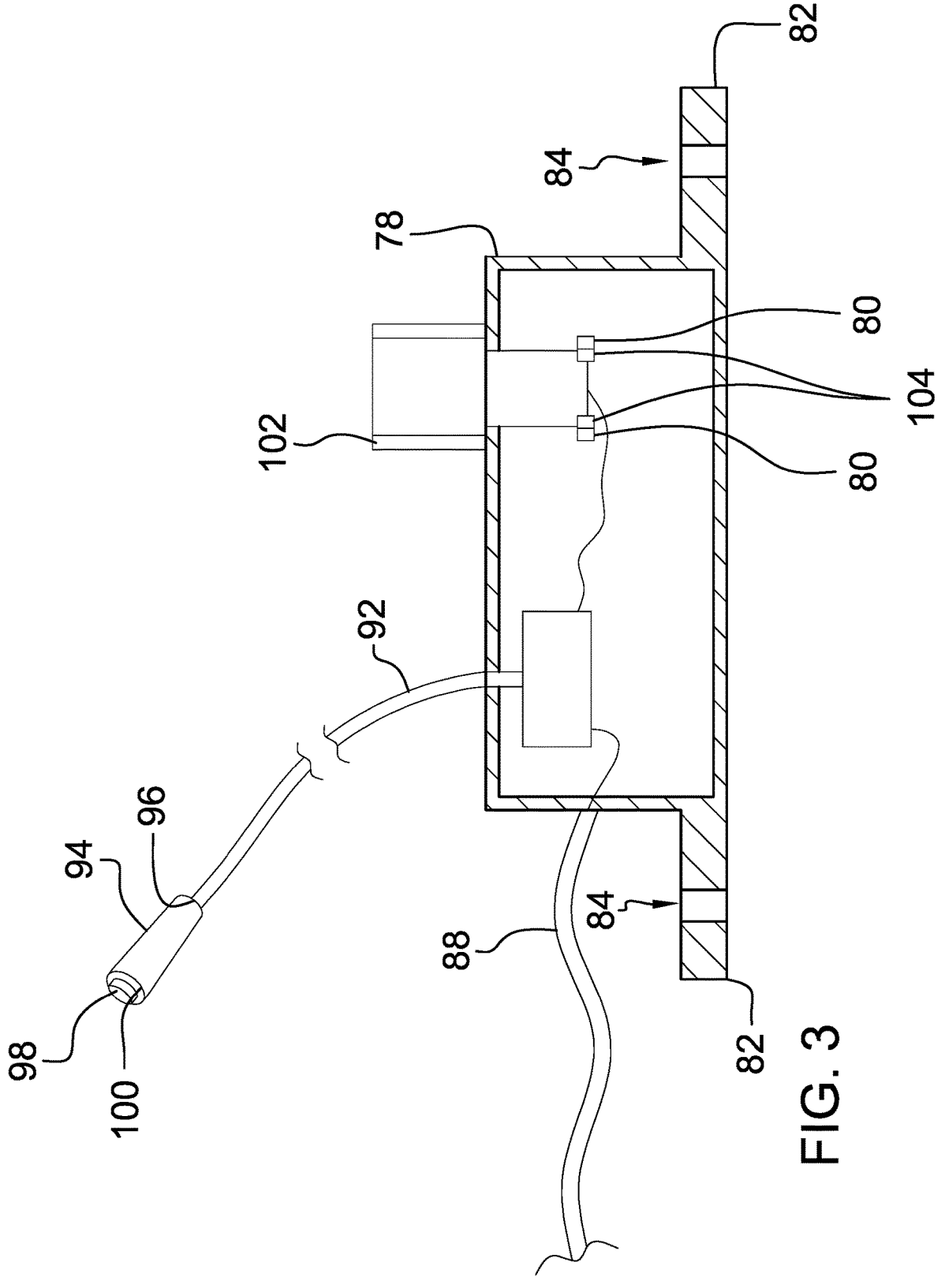
FIG. 3 is a cross sectional view taken along line 3-3 of FIG. 2 of an embodiment of the disclosure.
Figure 4:
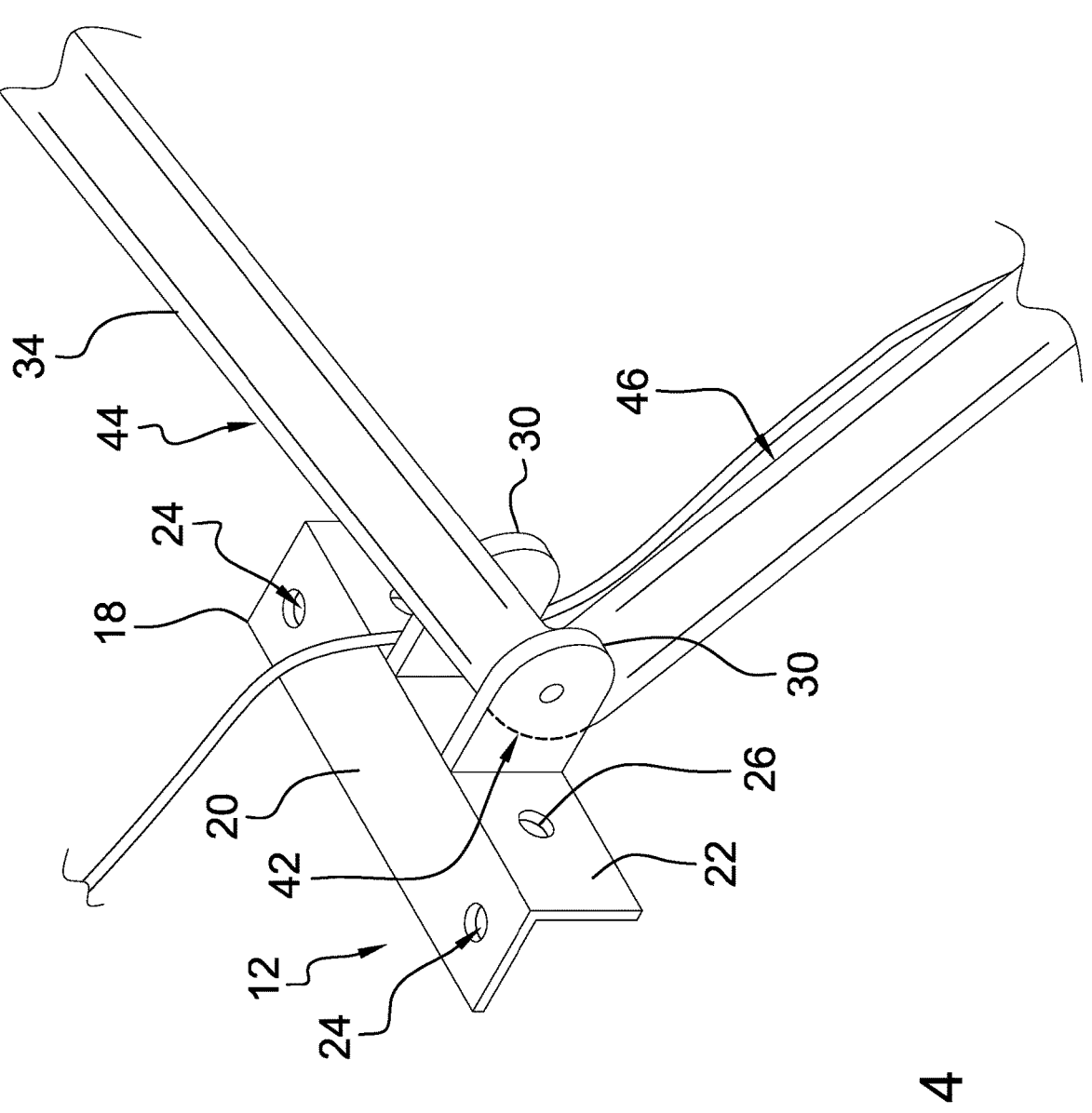
FIG. 4 is a detail view of a mount and a lever of an embodiment of the disclosure.
Figure 5:
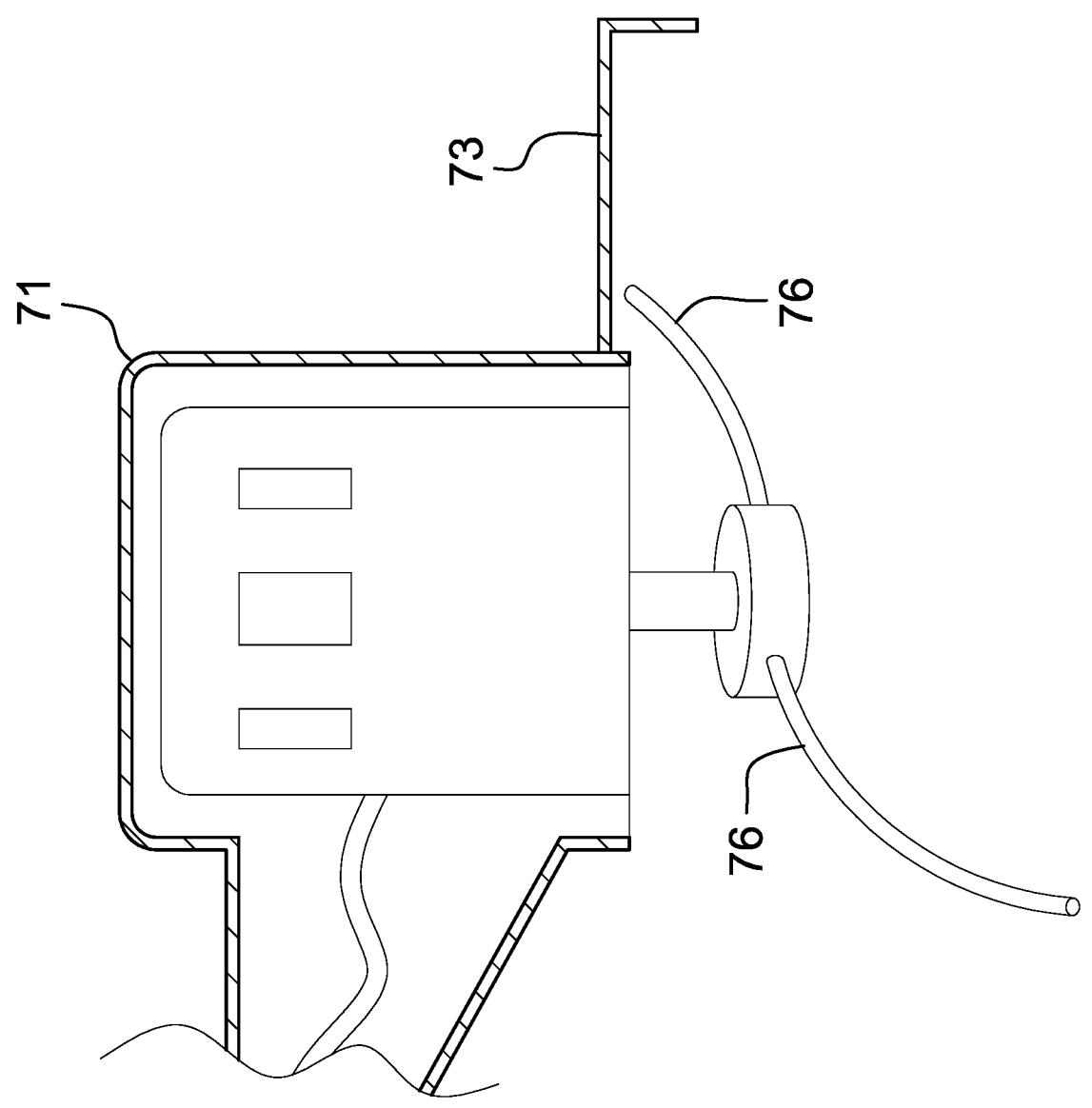
FIG. 5 is a cross sectional view taken along line 5-5 of FIG. 2 of an embodiment of the disclosure.
Figure 6:
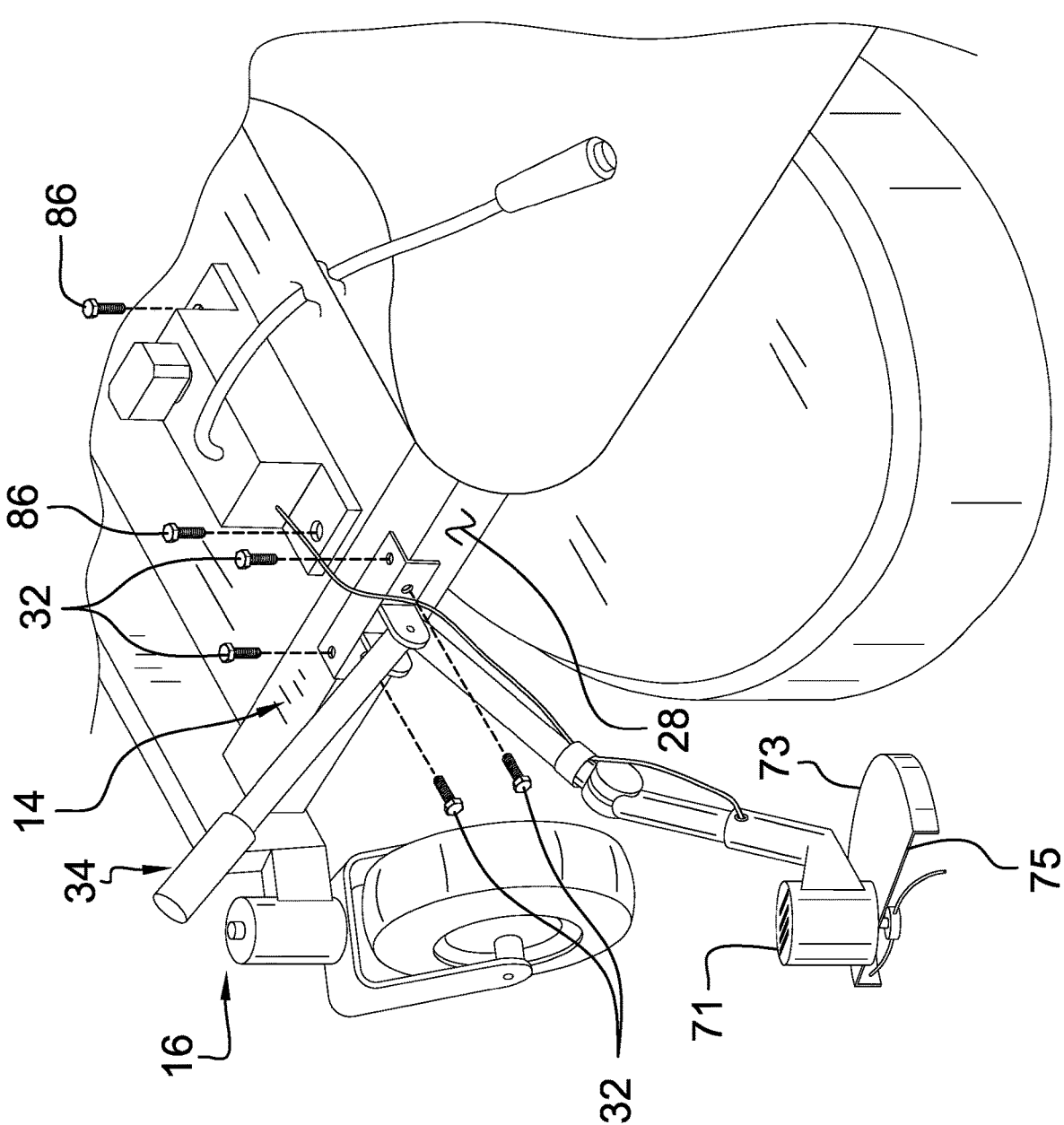
FIG. 6 is a perspective in-use view of an embodiment of the disclosure.
Figure 7:
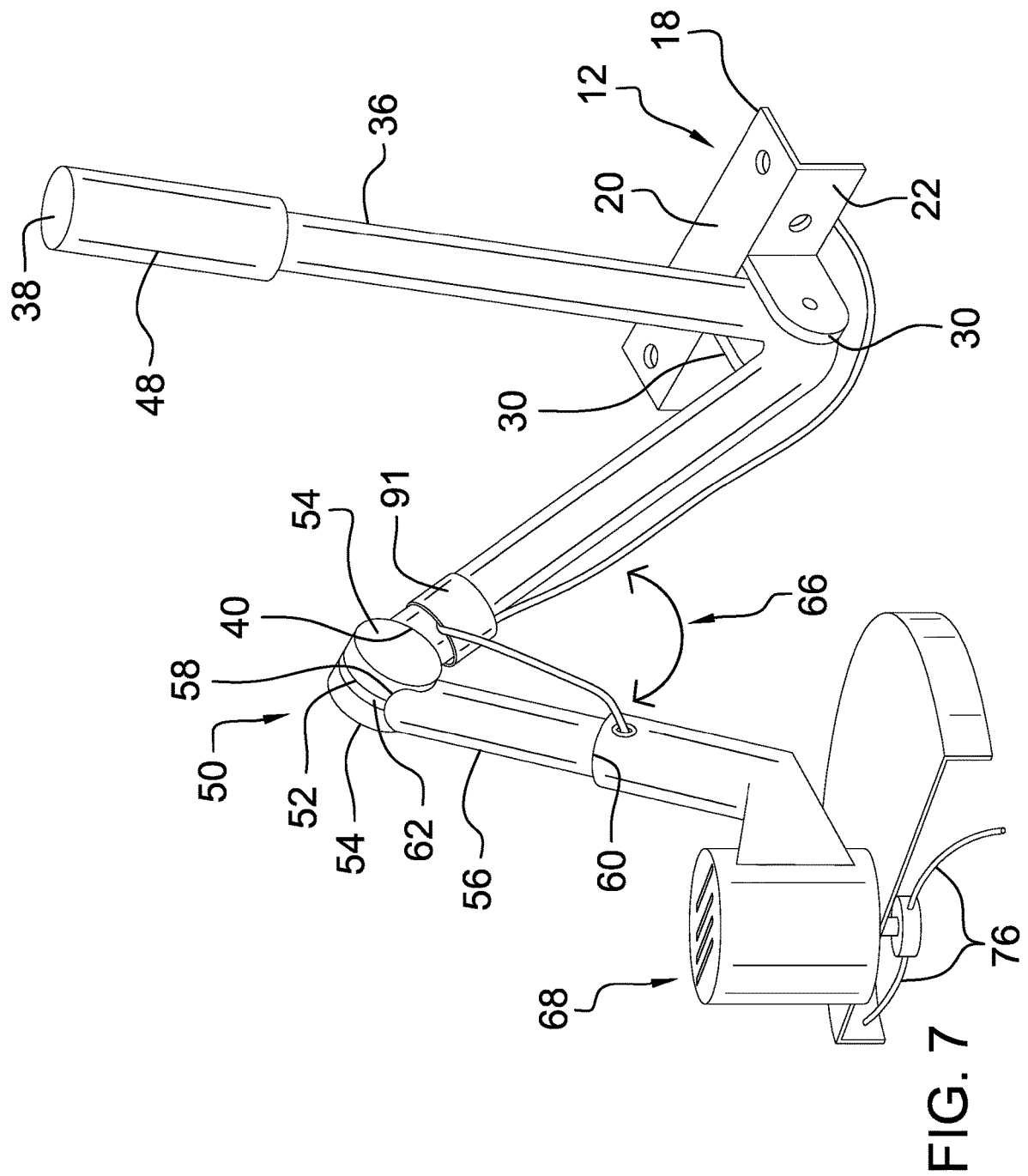
FIG. 7 is a perspective view of an embodiment of the disclosure showing an arm in a stored position.
Figure 8:
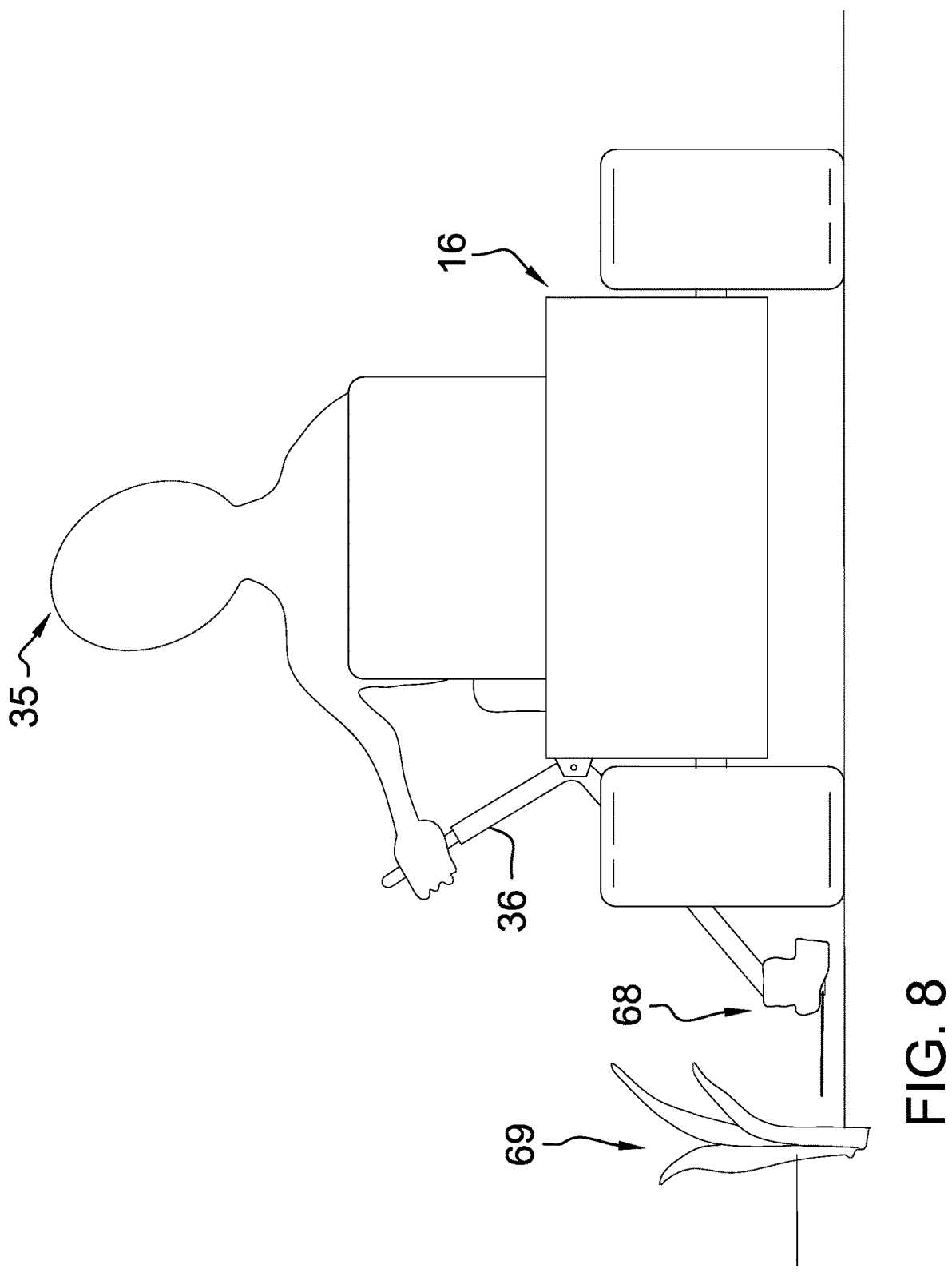
FIG. 8 is a rear side in-use view of an embodiment of the disclosure.

With reference now to the drawings, and in particular to FIGS. 1 through 8 thereof, a new weed trimmer device embodying the principles and concepts of an embodiment of the disclosure and generally designated by the reference numeral 10 will be described.

As best illustrated in FIGS. 1 through 8, the weed trimmer mount assembly 10 generally comprises a mount 12 that is attachable to a mounting location 14 of a riding lawn mower 16. The mount 12 comprises a bracket 18 that has a first panel 20 forming an angle with a second panel 22. The bracket 18 has a pair of first holes 24 extending through the first panel 20 and the bracket 18 has a pair of second holes 26 extending through the second panel 22. The first panel 20 rests on top of the mounting location 14 of the riding lawn mower 16 having the second panel 22 extending downwardly along an outer surface 28 of the mounting location 14. The riding lawn mower 16 may comprise a riding lawn mower 16 of any conventional design, including commercial riding lawn mowers and residential riding lawn mowers. The mount 12 includes a pair of tabs 30 that is each coupled to and extends away from the second panel 22 of the bracket 18 and the tabs 30 are spaced apart from each other. The mount includes a plurality of fasteners 32 and each of the fasteners 32 is extendable through a respective one of the first holes 24 and a respective one of the second holes 26 for attaching the bracket 18 to the mounting location 14. The fasteners 32 may comprise bolts, screws or any other type of mechanical fastener.

An arm 34 is pivotally attached to the mount 12 thereby facilitating the arm 34 to be accessible to a rider 35 of the riding lawn mower 16. The arm 34 is positionable between a deployed position and a stored position. The arm 34 comprises a lever 36 that has a first end 38 and a second end 40. The lever 36 has a bend 42 positioned between the first end 38 and the second end 40 to define a first portion 44 of the lever 36 forming an angle with a second portion 46 of the lever 36 such that the lever 36 has a V-shape. The bend 42 is positioned between the tabs 30 on the bracket 18 and the arm 34 includes a grip 48 that is positioned on the first portion 44 such that the grip 48 can be gripped by the rider 35 and the grip 48 extends from the first end 38 toward the bend 42.

The first portion 44 is vertically oriented on the mounting location 14 of the riding lawn mower 16 when the arm 34 is in the stored position having the second portion 46 angling upwardly and laterally away from the mounting location 14. The first portion 44 angles upwardly and laterally away from the mounting location 14 when the arm 34 is in the deployed position has the second portion 46 angling downwardly toward the ground. The arm 34 includes a pivot 50 which has a central disk 52 that is pivotally disposed between a pair of outer disks 54. The pivot 50 is attached to the second end 40 of the lever 36 such that the central disk 52 has a rotational axis that is perpendicularly oriented with an axis extending between the second end 40 of the lever 36 and the bend 42 in the lever 36. The central disk 52 rotates in a first direction when the lever 36 is positioned in the stored position. Conversely, the central disk 52 rotates in a second direction when the lever 36 is positioned in the deployed position.

The arm 34 includes a pole 56 that has a coupled end 58 and a free end 60 and the coupled end 58 is coupled to a perimeter edge 62 of the central disk 52 of the pivot 50. The free end 60 of the pole 56 is positioned adjacent to the ground when the lever 36 is positioned in the deployed position having the pole 56 forming a first angle 64 with the second portion 46 of the lever 36. The free end 60 of the pole 56 is lifted from the ground when the lever 36 is positioned in the stored position having the pole 56 forming a second angle 66 with the second portion 46 of the lever 36. Furthermore, the first angle 64 is greater than the second angle 66.

A weed trimmer 68 is provided and the weed trimmer 68 is coupled to the arm 34. The weed trimmer 68 is positioned adjacent to the ground when the arm 34 is positioned in the deployed position. In this way the weed trimmer 68 can be oriented for trimming weeds or grass 69 on the ground. The weed trimmer 68 is lifted from the ground when the arm 34 is positioned in the stored position thereby facilitating the riding lawn mower 16 to be operated in a normal manner. The weed trimmer 68 has a shaft 70 and a trimming head 72, the shaft 70 has a distal end 74 with respect to the trimming head 72 and the distal end 74 of the shaft 70 is attached to the free end 60 of the pole 56. The trimming head 72 rotates about a vertical axis when the lever 36 is positioned in the deployed position thereby facilitating trimming lines 76 on the trimming head 72 to trim the weeds or grass 69 when the weed trimmer 68 is turned on. The weed trimmer 68 may be an electric weed trimmer of any conventional design. The weed trimmer 68 may include a motor housing 71 and a shroud 73 that has a front side 75 that is open for exposing the trimming lines 76.

A speed control 77 is mounted to the riding lawn mower 16 such that the speed control 77 is accessible to the rider 35 of the riding lawn mower 16. The speed control 77 is in communication with the weed trimmer 68 and the speed control 77 turns the weed trimmer 68 on and off. Furthermore, the speed control 77 adjusts an operational speed of the weed trimmer 68 between a minimum speed and a maximum speed. The speed control 77 comprises a housing 78 that has a charging recess 79 extending into a top wall 81 of the housing 78 and the housing 78 has an electrical contact 80 that is disposed within the charging recess 79. The housing 78 has a pair of mounting tabs 82 each extending laterally away from the housing 78. Each of the mounting tabs 82 has a hole 84 extending through a respective mounting tab 82 to accommodate a fastener 86 for attaching the housing 78 to the lawn mower 16.

The speed control 77 includes a power cord 88 that is coupled between the housing 78 and the shaft 70 of the weed trimmer 68. Furthermore, the power cord 88 is electrically coupled to the electrical contact 80 in the charging recess 79 and the power cord 88 is electrically coupled to a motor 90 within the trimming head 72. The power cord 88 extends through a collar 91 that is positioned around the second portion 46 of the arm 34 thereby inhibiting the power cord 88 from draping downwardly from the arm 34. The speed control 77 includes a control cable 92 that is coupled to and extends away from the housing 78. The control cable 92 is electrically coupled to the power cord 88 and the control cable 92 has a grip 94 that is disposed on a distal end 96 of the control cable 92.

The control cable 92 has a button 98 that is movably disposed in a distal end 100 of the grip 94 on the control cable 92. The button 98 is biased into an off position and the button 98 is urgeable into an on position. The weed trimmer 68 is turned off when the button 98 is in the off position and the weed trimmer 68 is turned on when the button 98 is urged into the on position. Furthermore, the weed trimmer 68 is actuated between a minimum speed and a maximum speed which corresponds to a degree to which the button 98 is depressed into the grip 94 on the control cable 92. A rechargeable battery 102 is insertable into the charging recess 79 in the housing 78 and the rechargeable battery 102 has an electrical contact 104 that is in electrical communication with the electrical contact 80 in the charging recess 79 when the rechargeable battery 102 is inserted into the charging recess 79. In this way the motor 90 in the trimming head 72 of the weed trimmer 68 is powered by the rechargeable battery 102.

In use, the arm 34 is urged into the deployed position while the rider 35 is operating the riding lawn mower 16 to facilitate the weed trimmer 68 to trim the weeds and grass 69. In this way weeds or grass 69 can be trimmed along a sidewalk, for example, while a lawn is being mowed. Thus, trimming, edging and mowing can be accomplished with the riding lawn mower 16 is being operated. The arm 34 is urged into the stored position when the weed trimmer 68 is not needed. Furthermore, the rechargeable battery 102 can be removed from the charging recess 79 for charging in a battery charger.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A weed trimmer mount assembly for mounting a weed trimmer to a riding lawn mower, said assembly comprising:
   a mount configured to be attachable to a mounting location of a riding lawn mower;
   an arm being pivotally attached to said mount wherein said arm is configured to be accessible to a rider of the riding lawn mower, said arm being positionable between a deployed position and a stored position;
   a weed trimmer being coupled to said arm, said weed trimmer configured to be positioned adjacent to the ground when said arm is positioned in said deployed position thereby facilitating said weed trimmer to be oriented for trimming weeds on the ground, said weed trimmer configured to be lifted from the ground when said arm is positioned in said stored position thereby facilitating the riding lawn mower to be operated in a normal manner;
   a speed control configured to be mounted to the riding lawn mower such that said speed control is accessible to the rider of the riding lawn mower, said speed control being in communication with said weed trimmer, said speed control turning said weed trimmer on and off, said speed control adjusting an operational speed of said weed trimmer between a minimum speed and a maximum speed; and
   wherein said mount comprises:
      a bracket having a first panel forming an angle with a second panel, said bracket having a pair of first holes extending through said first panel, said bracket having a pair of second holes extending through said second panel, said first panel being configured to rest on top of the mounting location of the riding lawn mower having said second panel extending downwardly along an outer surface of the mounting location;
      a pair of tabs, each of said tabs being coupled to and extending away from said second panel of said bracket, said tabs being spaced apart from each other; and
      a plurality of fasteners, each of said fasteners being extendable through a respective one of said first holes and a respective one of said second holes wherein said fasteners are configured for attaching said bracket to the mounting location.

2. The assembly according to claim 1, wherein said arm comprising:
   a lever having a first end and a second end, said lever having a bend being positioned between said first end and said second end to define a first portion of said lever forming an angle with a second portion of said lever such that said lever has a V-shape, said bend being positioned between said tabs on said bracket, said lever having a grip being positioned on said first portion wherein said grip is configured to be gripped by the rider, said grip extending from said first end toward said bend, said first portion configured to be vertically oriented on the mounting location of the riding lawn mower when said arm is in said stored position having said second portion angling upwardly and laterally away from the mounting location, said first portion configured for angling upwardly and laterally away from the mounting location when said arm is in said deployed position having said second portion configured for angling downwardly toward the ground; and
   a pivot having a central disk being pivotally disposed between a pair of outer disks, said pivot being attached to said second end of said lever such that said central disk has a rotational axis being perpendicularly oriented with an axis extending between said second end of said lever and said bend in said lever, said central disk rotating in a first direction when said lever is positioned in said stored position, said central disk rotating in a second direction when said lever is positioned in said deployed position.

3. The assembly according to claim 2, wherein said arm includes a pole having a coupled end and a free end, said coupled end being coupled to a perimeter edge of said central disk of said pivot, said free end of said pole being positioned adjacent to the ground when said lever is positioned in said deployed position having said pole forming a first angle with said second portion of said lever, said free end of said pole being lifted from the ground when said lever is positioned in said stored position having said pole forming a second angle with said second portion of said lever, said first angle being greater than said second angle.

4. The assembly according to claim 3, wherein said weed trimmer has a shaft and a trimming head, said shaft having a distal end with respect to said trimming head, said distal end of said shaft being attached to said free end of said pole, said trimming head rotating about a vertical axis when said lever is positioned in said deployed position thereby facilitating trimming lines on said trimming head to trim weeds when said weed trimmer is turned on.

5. The assembly according to claim 2, wherein:

said weed trimmer has a shaft, a trimming head and a motor being positioned in said trimming head; and said speed control comprises:

a housing having a charging recess extending into a top wall of said housing, said housing having a pair of mounting tabs each extending laterally away from said housing, each of said mounting tabs having a hole extending through a respective mounting tab to accommodate a fastener for attaching said housing to the lawn mower, said housing having an electrical contact being disposed within said charging recess; and a power cord being coupled between said housing and said shaft of said weed trimmer, said power cord being electrically coupled to said electrical contact in said charging recess, said power cord being electrically coupled to a motor within said trimming head, said power cord extending through a collar being positioned around said second portion of said arm thereby inhibiting said power cord from draping downwardly from said arm.

6. The assembly according to claim 5, wherein said speed control includes a control cable being coupled to and extending away from said housing, said control cable being electrically coupled to said power cord, said control cable having a grip being disposed on a distal end of said control cable, said control cable having a button being movably disposed in a distal end of said grip on said control cable, said button being biased into an off position, said button being urgeable into an on position, said weed trimmer being turned off when said button is in said off position, said weed trimmer being turned on when said button is urged into said on position, said weed trimmer being actuated between a minimum speed and a maximum speed which corresponds to a degree to which said button is depressed into said grip on said control cable.

7. The assembly according to claim 5, wherein said speed control includes a rechargeable battery being insertable into said charging recess in said housing, said rechargeable battery having an electrical contact being in electrical communication with said electrical contact in said charging recess when said rechargeable battery is inserted into said charging recess thereby facilitating said motor in said trimming head of said weed trimmer to be powered by said rechargeable battery.

8. A weed trimmer mount assembly for mounting a weed trimmer to a riding lawn mower, said assembly comprising:

a mount configured to be attachable to a mounting location of a riding lawn mower, said mount comprising:

a bracket having a first panel forming an angle with a second panel, said bracket having a pair of first holes extending through said first panel, said bracket having a pair of second holes extending through said second panel, said first panel configured for resting on top of the mounting location of the riding lawn mower having said second panel extending downwardly along an outer surface of the mounting location;

a pair of tabs, each of said tabs being coupled to and extending away from said second panel of said bracket, said tabs being spaced apart from each other; and a plurality of fasteners, each of said fasteners being extendable through a respective one of said first holes and a respective one of said second holes wherein said fasteners are configured for attaching said bracket to the mounting location;

an arm being pivotally attached to said mount wherein said arm is configured to be accessible to a rider of the riding lawn mower, said arm being positionable between a deployed position and a stored position, said arm comprising:

a lever having a first end and a second end, said lever having a bend being positioned between said first end and said second end to define a first portion of said lever forming an angle with a second portion of said lever such that said lever has a V-shape, said bend being positioned between said tabs on said bracket, said lever having a grip being positioned on said first portion wherein said grip is configured to be gripped by the rider, said grip extending from said first end toward said bend, said first portion configured to be vertically oriented on the mounting location of the riding lawn mower when said arm is in said stored position having said second portion angling upwardly and laterally away from the mounting location, said first portion configured for angling upwardly and laterally away from the mounting location when said arm is in said deployed position having said second portion angling downwardly toward the ground;

a pivot having a central disk being pivotally disposed between a pair of outer disks, said pivot being attached to said second end of said lever such that said central disk has a rotational axis being perpendicularly oriented with an axis extending between said second end of said lever and said bend in said lever, said central disk rotating in a first direction when said lever is positioned in said stored position, said central disk rotating in a second direction when said lever is positioned in said deployed position; and a pole having a coupled end and a free end, said coupled end being coupled to a perimeter edge of said central disk of said pivot, said free end of said pole configured to be positioned adjacent to the ground when said lever is positioned in said deployed position having said pole forming a first angle with said second portion of said lever, said free end of said pole configured to be lifted from the ground when said lever is positioned in said stored position having said pole forming a second angle with said second portion of said lever, said first angle being greater than said second angle;

a weed trimmer being coupled to said arm, said weed trimmer configured to be positioned adjacent to the ground when said arm is positioned in said deployed position wherein said weed trimmer is configured to be oriented for trimming weeds on the ground, said weed trimmer configured to be lifted from the ground when said arm is positioned in said stored position thereby facilitating the riding lawn mower to be operated in a normal manner, said weed trimmer having a shaft and a trimming head, said shaft having a distal end with respect to said trimming head, said distal end of said shaft being attached to said free end of said pole, said trimming head rotating about a vertical axis when said lever is positioned in said deployed position thereby facilitating trimming lines on said trimming head to be configured to trim weeds when said weed trimmer is turned on; and a speed control configured to be mounted to the riding lawn mower such that said speed control is configured to be accessible to the rider of the riding lawn mower, said speed control being in communication with said weed trimmer, said speed control turning said weed trimmer on and off, said speed control adjusting an operational speed of said weed trimmer between a minimum speed and a maximum speed, said speed control comprising:

a housing having a charging recess extending into a top wall of said housing, said housing having a pair of mounting tabs each extending laterally away from said housing, each of said mounting tabs having a hole extending through a respective mounting tab to accommodate a fastener for attaching said housing to the lawn mower, said housing having an electrical contact being disposed within said charging recess;

a power cord being coupled between said housing and said shaft of said weed trimmer, said power cord being electrically coupled to said electrical contact in said charging recess, said power cord being electrically coupled to a motor within said trimming head, said power cord extending through a collar being positioned around said second portion of said arm thereby inhibiting said power cord from draping downwardly from said arm;

a control cable being coupled to and extending away from said housing, said control cable being electrically coupled to said power cord, said control cable having a grip being disposed on a distal end of said control cable, said control cable having a button being movably disposed in a distal end of said grip on said control cable, said button being biased into an off position, said button being urgeable into an on position, said weed trimmer being turned off when said button is in said off position, said weed trimmer being turned on when said button is urged into said on position, said weed trimmer being actuated between a minimum speed and a maximum speed which corresponds to a degree to which said button is depressed into said grip on said control cable; and a rechargeable battery being insertable into said charging recess in said housing, said rechargeable battery having an electrical contact being in electrical communication with said electrical contact in said charging recess when said rechargeable battery is inserted into said charging recess thereby facilitating said motor in said trimming head of said weed trimmer to be powered by said rechargeable battery.

9. A weed trimmer mount system for mounting a weed trimmer to a riding lawn mower, said system comprising:

a riding lawn mower having a mounting location:

a mount being attachable to said mounting location of said riding lawn mower, said mount comprising:

a bracket having a first panel forming an angle with a second panel, said bracket having a pair of first holes extending through said first panel, said bracket having a pair of second holes extending through said second panel, said first panel resting on top of said mounting location of said riding lawn mower having said second panel extending downwardly along an outer surface of said mounting location;

a pair of tabs, each of said tabs being coupled to and extending away from said second panel of said bracket, said tabs being spaced apart from each other; and a plurality of fasteners, each of said fasteners being extendable through a respective one of said first holes and a respective one of said second holes for attaching said bracket to said mounting location;

an arm being pivotally attached to said mount thereby facilitating said arm to be accessible to a rider of said riding lawn mower, said arm being positionable between a deployed position and a stored position, said arm comprising:

a lever having a first end and a second end, said lever having a bend being positioned between said first end and said second end to define a first portion of said lever forming an angle with a second portion of said lever such that said lever has a V-shape, said bend being positioned between said tabs on said bracket, said lever having a grip being positioned on said first portion wherein said grip is configured to be gripped by the rider, said grip extending from said first end toward said bend, said first portion being vertically oriented on said mounting location of said riding lawn mower when said arm is in said stored position having said second portion angling upwardly and laterally away from said mounting location, said first portion angling upwardly and laterally away from said mounting location when said arm is in said deployed position having said second portion angling downwardly toward the ground;

a pivot having a central disk being pivotally disposed between a pair of outer disks, said pivot being attached to said second end of said lever such that said central disk has a rotational axis being perpendicularly oriented with an axis extending between said second end of said lever and said bend in said lever, said central disk rotating in a first direction when said lever is positioned in said stored position, said central disk rotating in a second direction when said lever is positioned in said deployed position; and a pole having a coupled end and a free end, said coupled end being coupled to a perimeter edge of said central disk of said pivot, said free end of said pole being positioned adjacent to the ground when said lever is positioned in said deployed position having said pole forming a first angle with said second portion of said lever, said free end of said pole being lifted from the ground when said lever is positioned in said stored position having said pole forming a second angle with said second portion of said lever, said first angle being greater than said second angle;

a weed trimmer being coupled to said arm, said weed trimmer being positioned adjacent to the ground when said arm is positioned in said deployed position thereby facilitating said weed trimmer to be oriented for trimming weeds on the ground, said weed trimmer being lifted from the ground when said arm is positioned in said stored position thereby facilitating said riding lawn mower to be operated in a normal manner, said weed trimmer having a shaft and a trimming head, said shaft having a distal end with respect to said trimming head, said distal end of said shaft being attached to said free end of said pole, said trimming head rotating about a vertical axis when said lever is positioned in said deployed position thereby facilitating trimming lines on said trimming head to trim weeds when said weed trimmer is turned on; and a speed control being mounted to said riding lawn mower such that said speed control is accessible to the rider of said riding lawn mower, said speed control being in communication with said weed trimmer, said speed control turning said weed trimmer on and off, said speed control adjusting an operational speed of said weed trimmer between a minimum speed and a maximum speed, said speed control comprising:

a housing having a charging recess extending into a top wall of said housing, said housing having a pair of mounting tabs each extending laterally away from said housing, each of said mounting tabs having a hole extending through a respective mounting tab to accommodate a fastener for attaching said housing to the lawn mower, said housing having an electrical contact being disposed within said charging recess;

a power cord being coupled between said housing and said shaft of said weed trimmer, said power cord being electrically coupled to said electrical contact in said charging recess, said power cord being electrically coupled to a motor within said trimming head, said power cord extending through a collar being positioned around said second portion of said arm thereby inhibiting said power cord from draping downwardly from said arm;

a control cable being coupled to and extending away from said housing, said control cable being electrically coupled to said power cord, said control cable having a grip being disposed on a distal end of said control cable, said control cable having a button being movably disposed in a distal end of said grip on said control cable, said button being biased into an off position, said button being urgeable into an on position, said weed trimmer being turned off when said button is in said off position, said weed trimmer being turned on when said button is urged into said on position, said weed trimmer being actuated between a minimum speed and a maximum speed which corresponds to a degree to which said button is depressed into said grip on said control cable; and a rechargeable battery being insertable into said charging recess in said housing, said rechargeable battery having an electrical contact being in electrical communication with said electrical contact in said charging recess when said rechargeable battery is inserted into said charging recess thereby facilitating said motor in said trimming head of said weed trimmer to be powered by said rechargeable battery.

* * * * *